United States Patent
Burch et al.

(10) Patent No.: US 9,728,799 B2
(45) Date of Patent: Aug. 8, 2017

(54) FUEL CELL STARTUP METHOD FOR FAST FREEZE STARTUP

(71) Applicant: GM Global Technology Operations LLC, Detroit, MI (US)

(72) Inventors: Steven D. Burch, Honeoye Falls, NY (US); Bruce J. Clingerman, North Rose, NY (US); Abdullah B. Alp, Dearborn, MI (US); David A. Arthur, Acton, MA (US); Dirk Wexel, Mainz (DE); Martin Fasse, Selters (DE)

(73) Assignee: GM Global Technology Operations LLC, Detroit, MI (US)

( * ) Notice: Subject to any disclaimer, the term of this patent is extended or adjusted under 35 U.S.C. 154(b) by 350 days.

(21) Appl. No.: 14/450,741

(22) Filed: Aug. 4, 2014

(65) Prior Publication Data

US 2014/0342258 A1    Nov. 20, 2014

Related U.S. Application Data

(62) Division of application No. 11/536,759, filed on Sep. 29, 2006, now Pat. No. 8,835,065.

(51) Int. Cl.
| | | |
|---|---|---|
| *H01M 8/04* | (2016.01) | |
| *H01M 16/00* | (2006.01) | |
| *H01M 8/04858* | (2016.01) | |
| *H01M 8/04007* | (2016.01) | |
| *H01M 8/04223* | (2016.01) | |

(Continued)

(52) U.S. Cl.
CPC ........... *H01M 8/0488* (2013.01); *B60L 1/003* (2013.01); *B60L 1/02* (2013.01); *B60L 11/1868* (2013.01); *B60L 11/1885* (2013.01); *B60L 11/1887* (2013.01); *B60L 11/1894* (2013.01); *B60L 11/1898* (2013.01); *H01M 8/04007* (2013.01); *H01M 8/0432* (2013.01); *H01M 8/0494* (2013.01); *H01M 8/04268* (2013.01); *H01M 8/04559* (2013.01); *H01M 8/04626* (2013.01); *H01M 8/04947* (2013.01); *H01M 8/04992* (2013.01); *H01M 16/006* (2013.01); *B60L 2210/10* (2013.01); *Y02E 60/50* (2013.01);

(Continued)

(58) Field of Classification Search
None
See application file for complete search history.

(56) References Cited

U.S. PATENT DOCUMENTS

| | | |
|---|---|---|
| 6,849,352 B2 | 2/2005 | Formanski et al. |
| 2005/0008904 A1* | 1/2005 | Suppes ............... B60L 11/1881 |
| | | 429/9 |

(Continued)

FOREIGN PATENT DOCUMENTS

| | | |
|---|---|---|
| DE | 19954306 A1 | 7/2001 |
| JP | 2001229943 A * | 8/2001 |

(Continued)

*Primary Examiner* — Daniel Gatewood
(74) *Attorney, Agent, or Firm* — Quinn IP Law

(57) ABSTRACT

A method for starting a cold or frozen fuel cell stack as efficiently and quickly as possible in a vehicle application is based upon a state of charge of a first power source such as a high voltage battery. Power flow between the first power source and fuel cell system is coordinated in conjunction with a specific load schedule and parallel control algorithms to minimize the start time required and optimize system warm-up.

13 Claims, 4 Drawing Sheets

(51) Int. Cl.

| | |
|---|---|
| *H01M 8/0432* | (2016.01) |
| *H01M 8/04537* | (2016.01) |
| *H01M 8/04828* | (2016.01) |
| *H01M 8/04992* | (2016.01) |
| *B60L 1/00* | (2006.01) |
| *B60L 1/02* | (2006.01) |
| *B60L 11/18* | (2006.01) |

(52) U.S. Cl.
CPC ........ *Y02T 10/7066* (2013.01); *Y02T 10/7216* (2013.01); *Y02T 90/34* (2013.01)

(56) References Cited

U.S. PATENT DOCUMENTS

2005/0053810 A1\* 3/2005 Kato .................. H01M 8/0247
    429/429
2007/0298313 A1\* 12/2007 Iida ........................ B60L 1/003
    429/49

FOREIGN PATENT DOCUMENTS

| JP | 2004247052 A | 9/2004 | |
|---|---|---|---|
| WO | WO 2006006715 A1 \* | 1/2006 | .............. B60L 1/003 |

\* cited by examiner

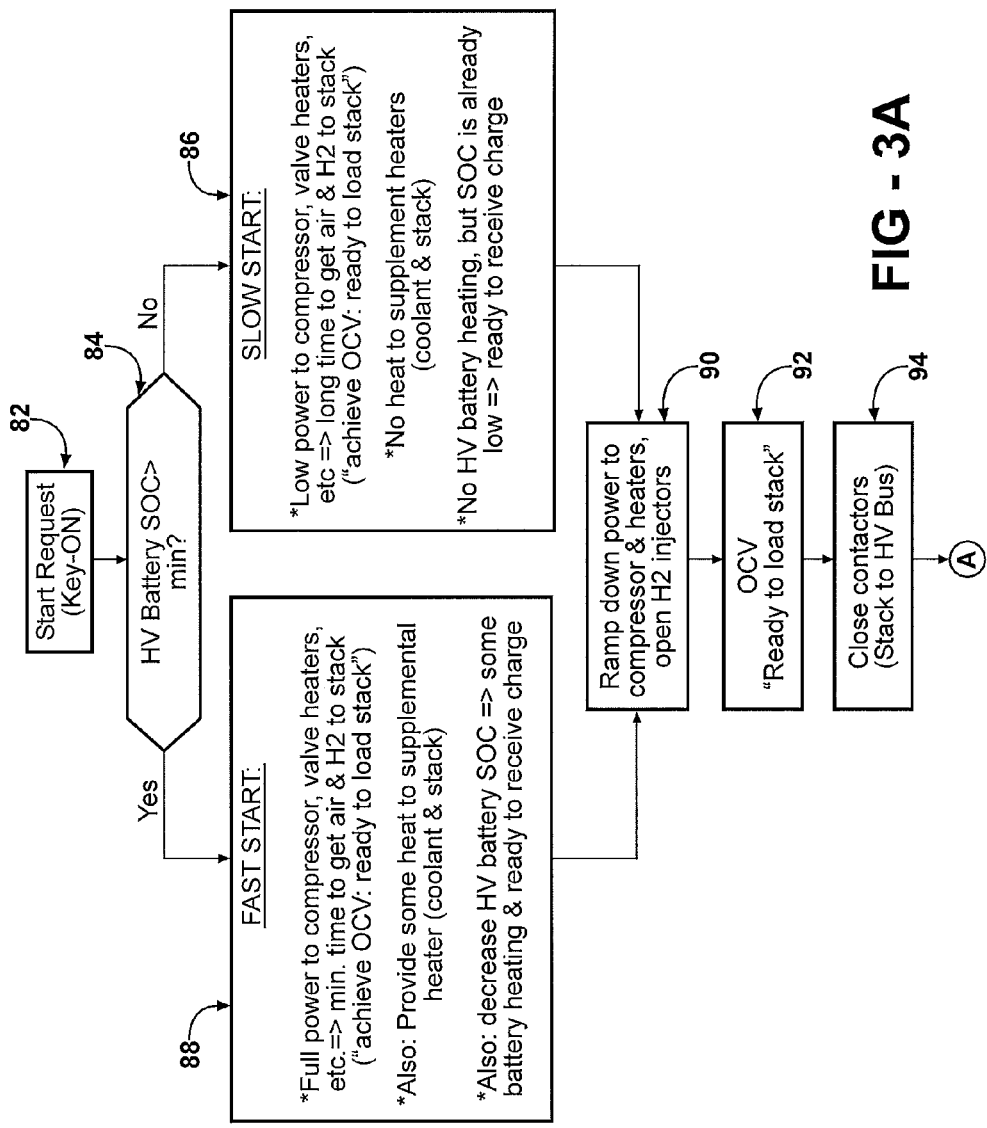

FUEL CELL STARTUP METHOD FOR FAST FREEZE STARTUP

CROSS-REFERENCE TO RELATED APPLICATION

This application is a divisional application of U.S. patent application Ser. No. 11/536,759 filed on Sep. 29, 2006, the entire disclosure of which is hereby incorporated herein by reference.

FIELD OF THE INVENTION

This invention relates to a method of operation for a fuel cell system. More particularly, the invention is directed to a method for starting a cold or frozen fuel cell system.

BACKGROUND SUMMARY

In vehicle applications, starting a frozen or cold fuel cell system has several challenges. Starting a cold or frozen fuel cell stack and related components requires a very specific and carefully coordinated procedure. In order to maximize operating performance, the fuel cell system must be started and warmed up as quickly as possible.

The startup method must be able to handle many different beginning use scenarios. For example, an operator may immediately subject the system to heavy demand before the fuel cell system reaches normal operating temperatures and is capable of fulfilling the power requirements to meet such a demand. Conversely, the operator may place little or no demand on the fuel cell system for an extended period of time, causing components of the fuel cell system to freeze since the fuel cell system is producing water but is not producing sufficient heat.

Another concern facing current fuel cell startup methods is adaptability to specific fuel cell system components and the specific condition of those components. As a stack degrades it may not tolerate the same loading schedule that a new stack can handle, and the variations betweens components in different systems may change the operating requirements of the startup method.

It would be desirable to have an adaptive method of starting a cold or frozen fuel cell that is able to balance increasing a temperature ramp-up rate of the fuel cell system by loading the fuel cell stack quickly without overloading the fuel cell stack or forcing it shut down due to low cell voltage, and account for different beginning use scenarios that an operator may place on a cold or frozen fuel cell system.

SUMMARY OF THE INVENTION

In agreement with the present invention, an adaptive method of starting a cold or frozen fuel cell that is able to balance increasing a fuel cell system's temperature ramp-up rate by loading the fuel cell stack quickly, without overloading the stack or forcing it shut down due to low cell voltage, and account for different beginning use scenarios that an operator may place on a cold or frozen fuel cell system has surprisingly been discovered. This method also optimizes the warm-up time for fuel cell systems and high voltage batteries, and minimizes the time required for the fuel cell system to run after a user causes the fuel cell system to shut down.

In one embodiment, the method for starting a fuel cell system having a fuel cell stack, a high voltage power source, and at least one startup component, comprises the steps of determining a state of charge of the high voltage power source; selecting a power source for starting the essential components as a function of the state of charge of the high voltage power source; controlling power flow between the fuel cell system and the high voltage power source; and maintaining a desired fuel cell stack voltage using a load schedule.

DESCRIPTION OF THE DRAWINGS

The above, as well as other advantages of the present invention, will become readily apparent to those skilled in the art from the following detailed description of a preferred embodiment when considered in the light of the accompanying drawings in which.

DETAILED DESCRIPTION OF THE PREFERRED EMBODIMENT

The following detailed description and appended drawings describe and illustrate various exemplary embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical.

Figure 1:
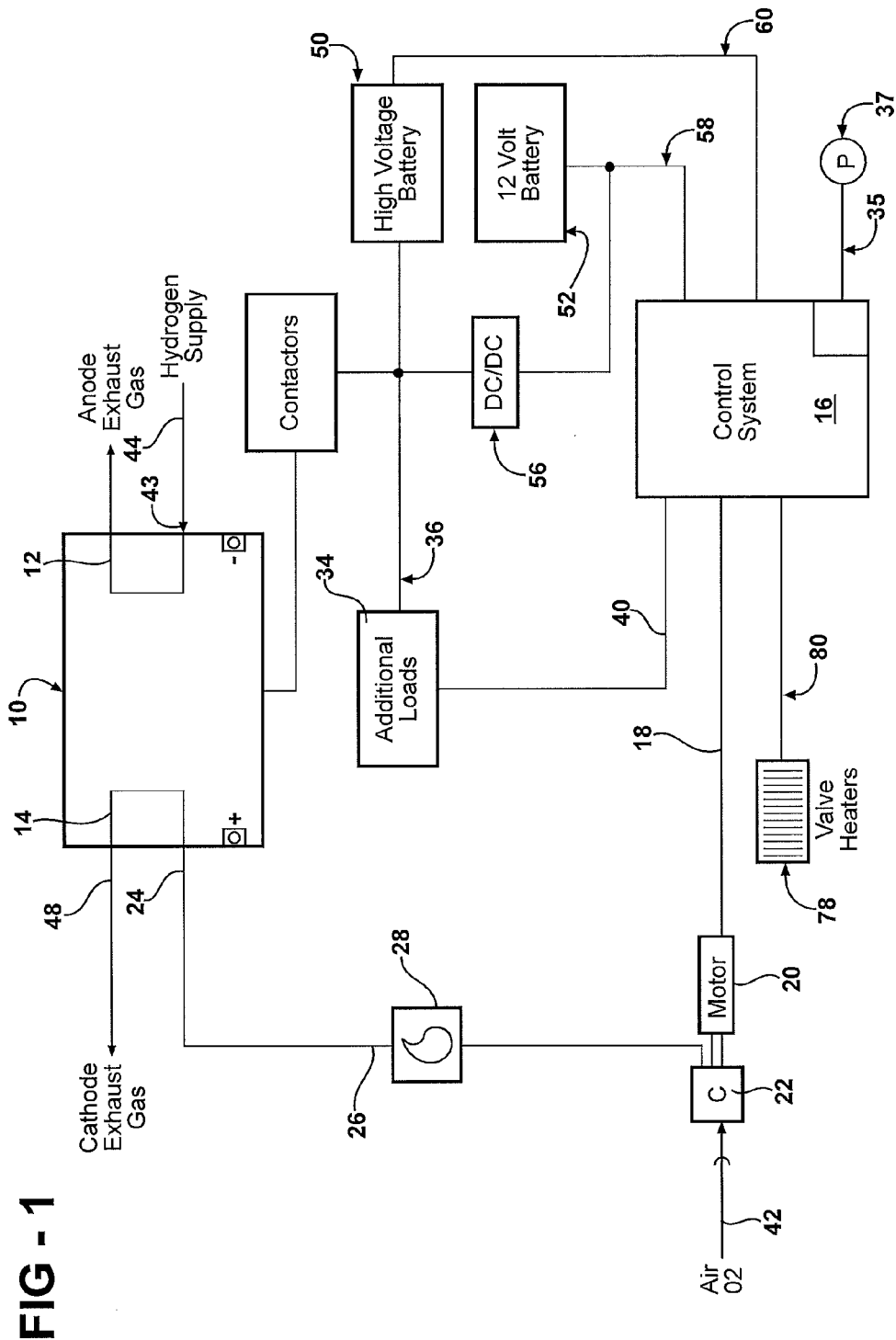
FIG. 1 is a schematic diagram of a fuel cell system according to an embodiment of the invention.

Referring now to FIG. 1, a basic layout of a fuel cell system with associated components is shown; in practice many variants are possible. A schematic representation of a fuel cell stack 10 integrated into a fuel cell system and consisting of a plurality of individual fuel cells which are connected electrically in series is shown. It is further understood that the individual fuel cells can be connected electrically in parallel without departing from the scope of this invention. The anode sides of all individual fuel cells of the fuel cell stack 10 are connected together in a manner commonly known in the art, with the resulting anode side of the stack being designated with the reference numeral 12. In a similar manner, the cathode sides of the fuel cells of the stack 10 are connected together in a manner commonly known in the art with the resulting cathode side of the stack being designated with the reference numeral 14. The operation of various types of fuel cell systems are commonly known in the art; one embodiment can be found in commonly owned U.S. Pat. No. 6,849,352, hereby incorporated herein by reference in its entirety. Therefore, only the operation of a fuel cell system as pertinent to this invention will be explained in the description.

In the embodiment shown herein, the fuel cell system includes a control system 16. The control system 16 is electrically linked via a connection 18 to a motor 20. The connection 18 may be any conventional means of electrical communication. The motor 20 is coupled with a compressor 22. The compressor 22 is in fluid communication with a cathode inlet 24 of the fuel cell stack 10 via an air supply conduit 26. The conduit 26 can be any conventional conduit providing a sealed passageway.

A humidifier 28 is disposed in the conduit 26 between the compressor 22 and the cathode inlet 24. Additionally, other components (not shown) may be provided between the compressor 22 and the cathode inlet 24 in other embodiments without departing from the scope of the invention.

The cathode side 14 of the fuel cell stack 10 includes a plurality of cathodes of individual fuel cells connected in a manner commonly known in the art. Each individual fuel cell has a plurality of channels between the cathode inlet 24 and a cathode outlet 48.

Figure 2:
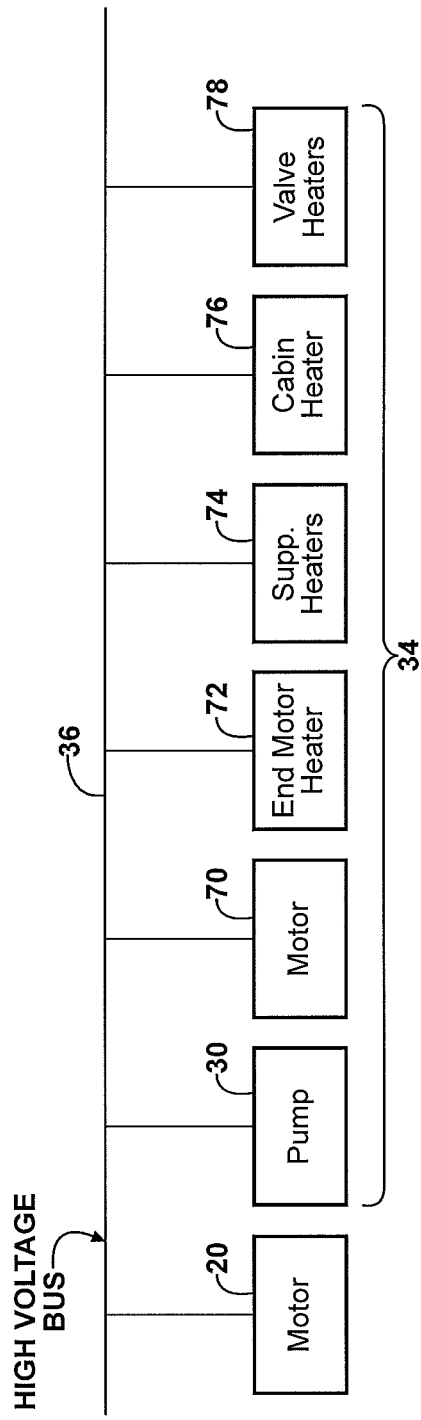
FIG. 2 is a block diagram showing a subsystem of the fuel cell system of FIG. 1, and FIGS. 3A and 3B combine to show a flow diagram illustrating a method of controlling the fuel cell of FIG. 1 with the flow diagram connecting at point A.

A plurality of loads 34 is electrically linked to the fuel cell stack 10 via a high voltage bus 36. The loads 34 are linked to the control system 16 via a connection 40. The loads 34 may include a high temperature coolant pump 30, a propulsion motor 70, a plurality of fuel cell stack end plate heaters 72, at least one electric supplemental cabin heater 76, an electric supplemental coolant heaters 74, and a plurality of valve heaters 78, for example as illustrated in FIG. 2.

The supplemental heaters 74 are typically disposed in a radiator bypass portion of the coolant loop (not shown). It is desirable for the heaters to have local closed-loop controls. Also, another load that may require electrical power at startup is the compressor motor 20 electrically linked to the high voltage bus 36.

A first power source 50 is electrically linked to the loads 34 via the high voltage bus 36, and linked to the control system 16 via a connection 60. It is desirable that the first power source 50 is a battery capable of generating a relatively high voltage of about 200 to 300 volts. A second power source 52 is linked to the control system 16 via a connection 58. It is desirable that the second power source 52 is a battery capable of generating about 12 volts. The battery 52 is also electrically linked to the high voltage bus 36 through a DC/DC boost circuit 56. The voltage bus 36 links the fuel cell stack 10 to the first power source 50 through a contactor 62.

Figure 3B:
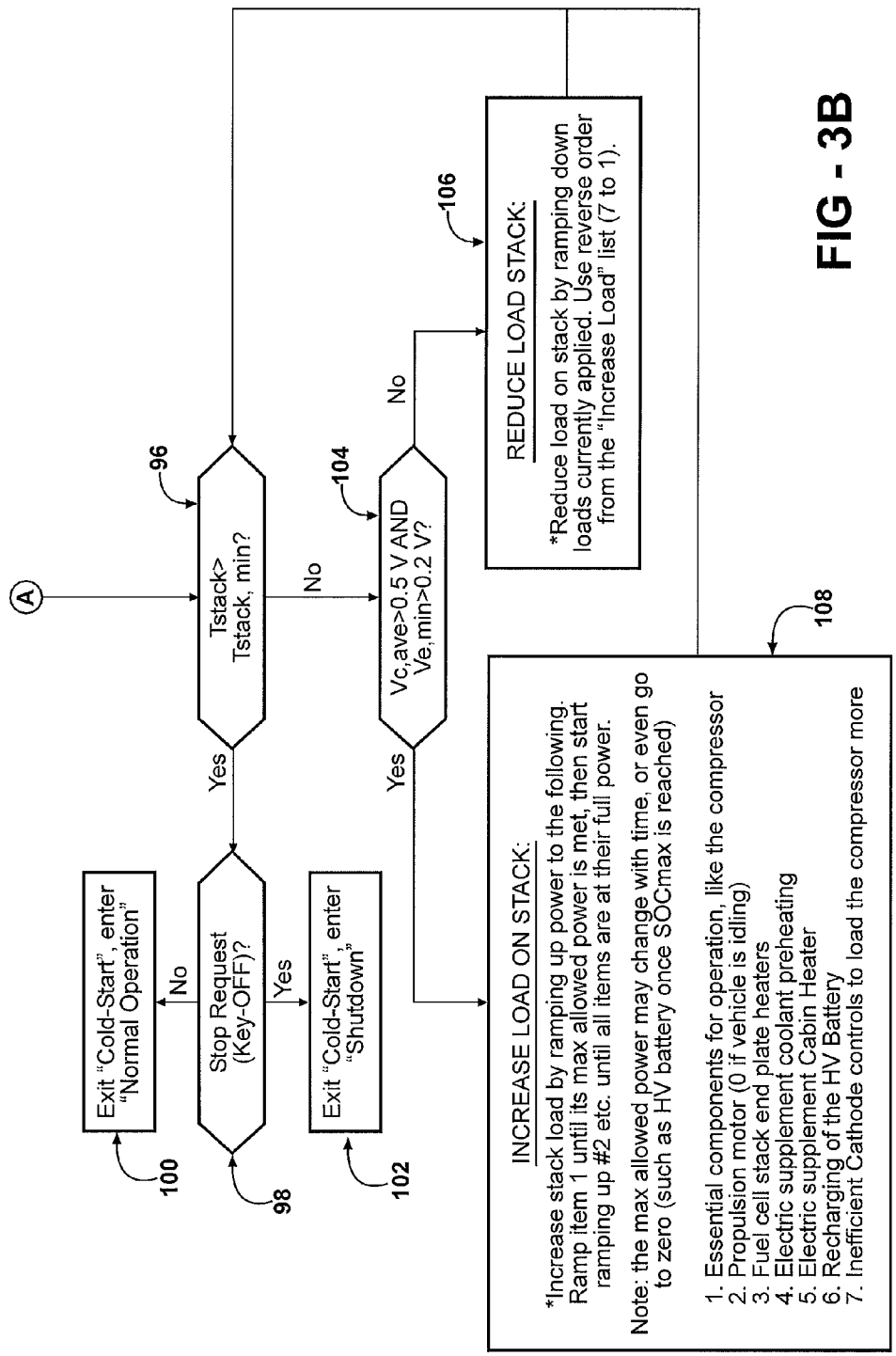

A method of controlling the fuel cell system is illustrated in FIGS. 3A and 3B. In operation, the control system 16 receives a start request 82 that may come from an operator of a vehicle (not shown). Upon receiving the start request 82 the control system 16 will determine the state of charge of the first power source 50 for sufficient energy, and determines a preferred startup option from a plurality of startup options at 84. Methods for checking the state of charge of a power source are commonly known in the art.

If sufficient energy is detected in the first power source 50 (Y at 84), then the control system 16 will command a fast start 88. Sufficient energy for this embodiment would be around 10 kW and 80 W-h. During the fast start 88 the control system 16 supplies full power to startup components of the fuel cell stack from the first power source 50. The startup components may include the motor 20 for the compressor 22, the valve heaters 78, and the high temperature coolant pump 30, for example. However, it is understood that power can be supplied to other components as desired. The control system 16 can also provide power to a plurality of the loads 34, which may include the fuel cell stack end plate heaters 72, and electric supplemental coolant heaters 74. The control system 16 provides power to the stack heaters 72, and the supplemental heaters 74, based on the system starting temperature. Real-time temperature monitoring is typically used to avoid undesirable localized hot spots adjacent to the heater. The discharging of the first power source 50 during a fast start 88 also helps to warm the first power source 50, increasing the available power and energy that can be drawn from the first power source 50 as the temperature increases, and thus indirectly decreasing the overall start time.

If insufficient energy is detected in the first power source 50 (N at 84), the control system 16 will command a slow start 86. During the slow start 86 the control system will supply less power than during a fast start 88 to the startup components from the second power source 52 through the DC/DC boost circuit 56. During the slow start 86 the control system 16 typically will not provide power to the loads 34 and will provide low power to the compressor motor 20 and the valve heaters 78.

The compressor 22, the valve heaters 78, and the high temperature coolant pump 30 are included in the startup components because air is pulled into the fuel cell system and compressed by the compressor 22 driven by the motor 20, and supplied to the cathode inlet 24 of the fuel cell stack 10. A speed of rotation of the air compressor 22 may be changed by the control system 16 by controlling the motor 20 thereby changing the air flow delivered by the air compressor 22. The control system 16 can also control the temperature of the valve heaters 78. The control system can control the speed of rotation of the high temperature coolant pump 30 via a connection, and thus, the coolant delivered to the fuel cell stack 10. However, the startup of the pump 30 may be delayed to maintain heat in the fuel cell stack.

Hydrogen gas is delivered to the anode side 12 in a manner commonly known in the art by fuel injectors 43. The valve heaters 78 maintain the fuel injectors 43 at a desired operating temperature. A reaction occurs between the air in the cathode side 14 and the hydrogen in the anode side 12 of the fuel cell stack 10 that releases electrons which can be drawn by external circuits (not shown) and the loads 34.

The control system 16 typically controls the air flow into the cathode side 24 of the fuel cell stack 10 as efficiently as possible in order to maximize the release of electrons. However, it may be desirable for the control system 16 to implement a set of inefficient cathode controls in order to increase the load on the fuel cell stack 10 and thus increase the rate of warmup of the fuel cell stack 10.

When the fuel cell stack 10 has reached open circuit voltage, the control system 16 ramps down power at 90 to the compressor 22, and the valve heaters 78 and opens the fuel injectors 43. When the fuel cell stack 10 achieves open circuit voltage at 92 the control system 16 closes the contactors 62 connecting the fuel cell stack 10 to the voltage bus 36 at 94. The control system 16 then begins loading the fuel cell stack 10. The control system 16 continuously monitors the temperature of the fuel cell stack 10 at 96.

Power is provided to the startup components and the loads 34 with a closed loop on the fuel cell stack 10 voltages according to a default load schedule at 108. The control system 16 may determine from specific operating conditions that the priority of the loads 34 be changed. It has been found desirable if the control system 16 loads the fuel cell stack to maintain an average cell voltage of 0.5 volts, or a minimum cell voltage of 0.2 volts at 104. If cell voltages are higher than desired, the control system 12 will add a load until either the desired average cell voltage or minimum cell voltage is achieved.

If the fuel cell stack 10 goes below either the desired average cell voltage or minimum cell voltage, the control system 16 reduces the load on the fuel cell stack 10 at 106 by removing the loads in the reverse order in which the loads were added. The loads are added and removed with ramp functions to avoid drastic changes to the fuel cell stack 10 under cold conditions.

The control system 16 supplies power from the fuel cell stack 10 according to the default load schedule at 108. First, power is supplied to the startup components of the fuel cell system such as the air compressor motor 20, the high temperature coolant pump 30, and the valve heaters 78. Second, power is supplied to the propulsion motor 70 if the vehicle is not idling. Third, power is supplied to the fuel cell stack end plate heaters 72. Fourth, power is supplied to the electric supplement coolant heaters 74. Fifth, power is supplied to the electric cabin heaters 76. Sixth, power is supplied to the recharging of the first power source 50. Seventh, the control system will implement inefficient cathode controls to further load the compressor 22.

The power supplied to the startup loads and loads 34 from the default load schedule 108 may change subject to the requirements of the startup loads and loads 34 with time. For example, if the first power source 50 is fully recharged during the sixth step of the default load schedule 108, then power to the first power source 50 will be zero.

The load schedule at 108 runs in parallel with the local control loops (not shown) such as temperature control loops for heaters, or vehicle operator requirements such as windshield defrost requirements. The local control loops may override the load schedule 108.

The operational order of supplying power from the fuel cell stack 10 to the startup components and loads 34 may change from the default load schedule based on specific circumstances. For example, the essential components, the supplement heaters 74, and the electric cabin heaters 76, can all be active without the fuel cell stack endplate heaters 72, if the local fuel cell stack end plate temperatures override the default loading schedule. Also, a request for windshield defroster may move the electric cabin heater 76 to a higher priority in the loading schedule. Further, if the first power source 50 has been drained enough to hurt drive-away performance it could be given priority over supplying power to the electric cabin heaters 76.

Increasing the load on the fuel cell stack 10 at 108 in order to achieve the desired average and minimum cell voltages at 104 should be maintained until the target temperature is achieved at 96. The automobile idle may now be up to or above 30% of the full system power, e.g., 30 kW for a system capable of 90 kW.

If the system receives a stop-request 98 prior to the threshold temperature being reached, it may be desirable to complete the normal warm-up procedure at 100 until the target temperature at 96 is reached. This could also ensure that the first power source 50 is returned to a threshold state of charge before shutdown. If the warm-up has been sufficiently completed then the control system 16 will exit the start-up and shutdown the system at 102.

From the foregoing description, one ordinarily skilled in the art can easily ascertain the essential characteristics of this invention and, without departing from the spirit and scope thereof, make various changes and modifications to the invention to adapt it to various usages and conditions.

What is claimed is:

1. A method of starting a fuel cell system, the method comprising the steps of:
   providing a fuel cell stack, a plurality of startup components, and at least one power source;
   starting the plurality of startup components using the at least one power source;
   connecting the fuel cell stack to a voltage bus after the fuel cell stack achieves open circuit voltage, wherein the voltage bus provides electrical communication between the fuel cell stack and at least one of the plurality of startup components;
   opening at least one fuel injector after the fuel cell stack achieves open circuit voltage and prior to connecting to the voltage bus; and
   controlling the fuel cell stack power using a load schedule to maintain a desired fuel cell voltage.

2. The method according to claim 1, wherein the at least one power source comprises a first power source and a second power source.

3. The method according to claim 2, wherein the first power source is a first battery and the second power source is a second battery and the first battery generates a higher voltage than the second battery.

4. The method according to claim 3, wherein the second battery is electrically linked to the voltage bus through a DC/DC boost circuit.

5. The method according to claim 3, wherein the first battery generates a voltage between 200 and 300 volts and the second battery generates a voltage between 0 and 12 volts.

6. The method according to claim 2, further comprising the steps of:
   determining a state of charge of the first power source;
   starting the plurality of startup components using the first power source if the state of charge of the first power source is determined to be sufficient; and
   starting the plurality of startup components using the second power source if the state of charge of the first power source is determined to be insufficient.

7. The method according to claim 6, wherein the starting of the plurality of startup components using the first power source includes applying full power to at least one of the plurality of startup components and the starting of the plurality of startup components using the second power source includes applying less than full power to each of the plurality of startup components and no power to at least one of the startup components.

8. The method according to claim 1, wherein the controlling of the fuel cell stack power includes increasing the power delivered by the fuel cell stack to each of the start-up components and the at least one power source in an order determined by the load schedule until the fuel cell stack reaches a predetermined temperature.

9. The method according to claim 8, wherein the load on the fuel cell stack is reduced by decreasing the power delivered to the start-up components and the at least one power source in a reverse order according to the load schedule when the fuel cell stack goes below one of a desired average cell voltage of the fuel cell stack and a minimum cell voltage of one of the fuel cells included within the fuel cell stack.

10. The method according to claim 9, wherein the power delivered by the fuel cell stack is increased and decreased according to a ramp function.

11. The method according to claim 1, further comprising the step of decreasing power to the at least one of the startup components after the fuel cell stack achieves open circuit voltage and prior to connecting the fuel cell stack to the voltage bus.

12. The method according to claim 1, further comprising the step of controlling the plurality of startup components in electrical communication with the fuel cell stack using local control loops capable of overriding the load schedule.

13. A method of starting a fuel cell system, the method comprising the steps of:

providing a fuel cell stack, a plurality of startup components, and at least one power source, wherein the at least one power source comprises a first power source and a second power source;

starting the plurality of startup components using the at least one power source;

connecting the fuel cell stack to a voltage bus after the fuel cell stack achieves open circuit voltage, wherein the voltage bus provides electrical communication between the fuel cell stack and at least one of the plurality of startup components;

controlling the fuel cell stack power using a load schedule to maintain a desired fuel cell voltage;

determining a state of charge of the first power source;

starting the plurality of startup components using the first power source if the state of charge of the first power source is determined to be sufficient; and starting the plurality of startup components using the second power source if the state of charge of the first power source is determined to be insufficient;

wherein the starting of the plurality of startup components using the first power source includes applying full power to at least one of the plurality of startup components and the starting of the plurality of startup components using the second power source includes applying less than full power to each of the plurality of startup components and no power to at least one of the startup components.

* * * * *